US005149241A

United States Patent [19]

Haymore et al.

[11] Patent Number: 5,149,241

[45] Date of Patent: Sep. 22, 1992

[54] DUAL MAST APPARATUS FOR STORAGE AND RETRIEVAL VEHICLES

[75] Inventors: Ralph B. Haymore, Salt Lake City; Mark I. Johnson, American Fork, both of Utah

[73] Assignee: Eaton-Kenway, Inc., Salt Lake City, Utah

[21] Appl. No.: 684,423

[22] Filed: Apr. 12, 1991

Related U.S. Application Data

[63] Continuation-in-part of Ser. No. 653,837, Feb. 11, 1991.

[51] Int. Cl.[5] .............................................. B65G 1/00

[52] U.S. Cl. .................................. 414/279; 187/8.59; 187/11; 254/DIG. 9; 414/282

[58] Field of Search ............... 414/277, 279, 281, 282; 187/11, 20, 27, 859; 188/65.1, 170, 171; 254/267-286, 323-334, 358, 359, 902, DIG. 9

[56] References Cited

U.S. PATENT DOCUMENTS

| | | | |
|---|---|---|---|
| 3,556,266 | 1/1971 | McCarthy | 188/171 |
| 3,770,147 | 11/1973 | Kito et al. | 414/282 |
| 3,887,038 | 6/1975 | Buschbom et al. | 187/27 |
| 3,993,202 | 11/1976 | Neitzel | 414/282 |
| 4,331,418 | 5/1982 | Klebe | 414/277 |
| 4,466,765 | 8/1984 | Mautino | 414/277 |
| 4,509,620 | 4/1985 | Verbos | 188/171 |
| 5,020,957 | 6/1991 | Liston | 414/279 |

FOREIGN PATENT DOCUMENTS

| | | | |
|---|---|---|---|
| 2199299 | 7/1988 | United Kingdom | 187/27 |
| 2437208 | 2/1976 | Fed. Rep. of Germany | 414/458 |
| 2390371 | 1/1979 | France | 187/11 |
| 526844 | 5/1955 | Italy | 414/281 |
| 303278 | 6/1971 | U.S.S.R. | 414/279 |
| 313766 | 12/1971 | U.S.S.R. | 187/27 |
| 451603 | 12/1974 | U.S.S.R. | 187/20 |
| 502822 | 4/1976 | U.S.S.R. | 187/27 |
| 609707 | 6/1978 | U.S.S.R. | 187/20 |

*Primary Examiner*—Michael S. Huppert
*Assistant Examiner*—Robert S. Katz
*Attorney, Agent, or Firm*—Lynn G. Foster

[57] ABSTRACT

A novel dual mast storage and retrieval vehicle comprising structure which maintains each mast essentially vertical as variably weighted heavy loads are placed on a carriage disposed between the masts. Each mast is disposed near the center of a separately supported base such that bending of the base under such loads induces little off-vertical deflection to the mast. The separately supported bases are coupled by a connector which comprises cross-aisle and vertical degrees of freedom but is strictly constrained in the down-aisle direction. In the currently preferred embodiment, two down-aisle drive motors, in master/slave relationship, provide a synchronous drive for the vehicle. Further, interconnecting joints a strut at the top of the masts and of the carriage comprise hinges which resist propagation of mast induced moments caused by beam deflection or vehicle dynamics. The invention comprises a lift cable vertical drive assembly wherein a motor is horizontally disposed down-aisle in line with a lift cable winding and unwinding drum. The vertical drive assembly is modularly assembled on a frame and is attachable and detachable from the vehicle as a unit. The vertical drive assembly comprises, in seriatim, the motor, a belt drive sprocket wheel, a drive belt, a belt driven sprocket wheel, and, juxtaposed and on the same axis as the driven sprocket wheel, an input adapter, a speed reducer, and a two lift cable drum. The motor is attached to the frame by jacks used to raise and lower the motor to adjust tension in the belt.

3 Claims, 8 Drawing Sheets

DUAL MAST APPARATUS FOR STORAGE AND RETRIEVAL VEHICLES

This is a continuation-in-part of U.S. patent application Ser. No. 653,837 filed Feb. 11, 1991.

FIELD OF INVENTION

This invention relates to storage and retrieval (S/R) vehicles and more particularly to heavy-load, dual mast apparatus for S/R vehicles.

BACKGROUND AND DESCRIPTION OF RELATED ART

A dual mast S/R vehicle is used in automatic storage systems to transport large and heavy goods along an aisle to a designated storage compartment within a rack or structure usually when the maximum weight of such goods exceeds the lift and/or carrying capacity of a single mast S/R vehicle. Dual mast S/R vehicles are known and commercially used in the art.

Generally, dual mast S/R vehicles comprise three operational degrees of freedom. The first degree of freedom constitutes a direction of movement, generally described as down-aisle, whereby each vehicle accesses the position of each addressable column of material stored along an aisle of a S/R facility. Material is stored on shelving or the like in horizontally and vertically addressable arrays such that inventory is transported between the arrays and the S/R vehicle in a direction normal to the aisle, generally referred to as cross-aisle. The second degree of freedom comprises operation of a shuttle which is mounted on a vertically driven carriage and moves cross-aisle to the material storing arrays whereby inventory is retrieved and stored. The third degree of freedom comprises vertical drive for the carriage. This invention provides novel apparatus and methods for down-aisle and vertical movement of large and heavy loads of goods.

Presently available dual mast S/R vehicles comprise two masts disposed upon a single base and supported by a drive wheel on one end and and idler wheel on the other end of the base. Vertical drive for the carriage comprises a cable drum, a motor, and a power transfer assembly. The cable drum is rotated by the motor and power transfer assembly to wind and unwind attached lift cables, thereby lifting and lowering the carriage. For tall masts, the cable drum for a dual mast S/R vehicle is mounted cross-aisle and due to cross-aisle width limitations the cable system is limited to 2 pulls. The preferred embodiment is a right angle speed reducer connected directly to the motor and the motor is disposed at right angles to the cable drum. Large motors, required by dual mast S/R vehicles, are therefor usually mounted upright.

Each of the two masts are substantially symmetrically disposed on the single support beam near the ends of the beam to thereby be separated by the length of the carriage. In this position, any bending of the base due to forces of the combined mast, carriage and load weight, tips the bottom of the two masts toward each other while the top spacing is maintained by the beam mast cap. Thus, the long span between the wheels and the total load supported in a single beam results in the need for special mast to base shimming or the base member to have much higher cross sectional properties to reduce mast deflections, caused by bending of the base, to acceptable levels for safe carriage operation when transporting maximum loads. Such required increases in cross section nearly doubles the height of a dual mast supporting base over a single mast supporting base. The increased loading of the base and masts on only two wheels requires that the wheel diameters as well as the wheel bearing size be increased. Each of these increases place an additional burden upon equipment used in the manufacture of dual mast systems. Further, increases in beam cross section and supporting wheel and bearing sizes increase the height of the lowest elevation (low bay) a carriage may serve, adding complications in building design and reducing the effective volume of storage space.

In current art, a single rigid interconnecting mast cap beam is employed to connect the two mast tops together. The cap comprises a moment transmitting, rigid joint in each end. The mast cap is only fractionally as strong as the mast and carries the same which can moments exerted by the bending masts. Thus, as masts deflect in response to a bending base and forces comprising vehicle running loads are added thereto, moments caused by the mast top movement against the restraining cap beam results in stresses great enough to possibly break the joint bolts and to crack rigid steel joint members at the tops of the masts.

Presently available dual S/R vehicles comprise vertical drive components of vertical drive assemblies which are individually mounted on the dual mast S/R vehicle structure. As such, the presently available vertical drive assemblies are assembled and tested only after the major dual mast S/R vertical drive assembly supporting components, which usually comprises an assembled vehicle, are available at the job site.

All dual mast S/R vehicles must conform to the clearance requirements of the aisle where used. Such requirements predefine a significant width limitation on allowable dimensions of dual mast S/R vehicles and parts assembled thereon. In the past, such limitations have led to the development of dual mast S/R vehicles which employ vertically mounting of large motors, and, therefore, right angle speed reducers to translate vertical motor rotary motion in horizontal plan to a horizontal drum vertical rotary motion which winds and unwinds a vertically disposed lift cable.

Generally, dual mast S/R vehicles comprise a mounting frame, a motor mounted to the frame, and a drum assembly which raises and lowers the carriage by winding and unwinding at least one carriage supporting lift cable. A speed reducer is commonly used between the motor and drum to translate relatively high rotational speed of the motor to a lower rotating speed required of the cable winding and unwinding drum.

In the present art, there are two methods of mounting a motor relative to the position of the drum. The first method comprises mounting the drum directly to the speed reducer output shaft and, thereby, directly coupling the motor to the drum along a common axis. In-line connections among the motor, speed reducer, and drum, severely limit the collective and individual sizes of motors, reducers, and drums and cable pull configurations which may be used and yet stay within the above mentioned width limitation, especially in dual mast systems.

To solve problems provided by the first method, the second method, comprises a vertically disposed and mounted motor and a right angle motor to drive the horizontally disposed drum. A power translation device, capable of withstanding low speed, high torque, driving forces, is disposed between the motor and drum. The drum, for a high mast dual mast S/R vehicle, can only wrap the cable length from a two pull cable system and keep the dual mast S/R vehicle within cross-aisle dimensional limits.

The second method has improved space, orientation, and speed flexibility over the first method, but requires a chain be used as the power translation device to drive the drum at the site of maximum tension. Commonly, such use of chains requires frequent maintenance and constant lubrication. Further, chains most often use tensioners which push against the side of the chain to maintain proper tautness in the chain. There is no tensioning required in the first method.

Generally, the present art uses a brake mounted on the end of the motor. Such brakes are usually electrically released, spring acutated axial disc brakes. Such braking is ineffective in the event of chain failure.

BRIEF SUMMARY AND OBJECT OF THE INVENTION

In brief summary, this invention alleviates all of the known problems related to providing a dual mast S/R vehicle which comprises low bay, high mast transport of heavy loads. The invention comprises novel structure for maintaining the dual mast essentially parallel during heavy load transport, a modular vertical drive assembly which aligns a lift cable drum normal to the upward path of a carriage lift cable, and mast caps with interconnecting pinned joints which resist communication of bend producing moments between the masts.

The invention comprises two mast supporting bases separately supported and driven along the rail and releasibly, but firmly attached one to the other. The dual mast S/R vehicle may be assembled from two single mast systems with modifications comprising of and providing a single vertical drive assembly and a single electrical control system. Thus, each mast supporting base is essentially one-half the total down-aisle vehicle length and each base carries substantially half of the total vehicle and load weight on its own supporting wheels and thereby the total load carried by dual mast S/R vehicle is essentially twice the load carried by a single mast S/R vehicle.

Each mast is mounted substantially in the middle of the associated base. Thus, as bending occurs in each base due to forces of apparatus and load weight being imposed by the mast, each bending base deflects, but maintains substantially vertical support for each mast. Also, the beam which interconnects the masts at the top is joined hingeably by pins to minimize transmission of bending moments between the masts. Thus base deflections cause a very small bending effect upon the masts, allowing the masts to remain essentially equally spaced over their entire height independent of transported load and transmit substantially no bending moments through the junction of the mast top interconnecting beam.

The drum is oriented down-aisle to permit lengthening of each drum to accommodate ever increasing mast height while permitting all drive and control components to fit within the width envelope of dual mast S/R vehicles. The vertical drive assembly comprises a mounting frame which supports all of the vertical drive assembly components. In this novel invention, the entire vertical drive assembly is modularly assembled on the mounting frame for facile attachment to and detachment from a vehicle support frame which is attached to the vehicle. The mounting frame is releasibly attached to a vehicle support frame by readily accessible mounting bolts. Further, the mounting frame is attached to the base by a base mount which comprises mount legs. On one end, the mount legs comprise hinged connections and on the other, variable length mount legs are employed to angle the base mount, thereby providing a mount angle which aligns the drum perpendicularly to the fleet angle of each lift cable from the drum to the mast top.

The mounting frame supports the combination motor, power transfer assembly and a drum assembly. The drum assembly comprises a cable winding drum and mounting for a speed reducer mounted in line with and inside the drum whereby the speed reducer serves as a bearing for one end of the drum as well as the speed reducer.

The speed reducer is belt driven by the motor through an input adapter, thereby bypassing the need for a drive chain. The motor is joined to the frame by motor jacks, the adjusting of which tightens or loosens the tension of the belt. As the belt operates at the high speed velocity of the motor, light weight sprocket wheels are used to interconnect the belt to the motor and to the input adapter to reduce starting inertia.

A spring actuated, electrically released, disc brake is mounted on the input adapter end of the vertical drive frame. The brake disc is attached to the driven sprocket which mounts to the input adapter input shaft.

Accordingly, it is a primary object to provide a dual mast S/R vehicle comprising two separate bases whereupon each of which a mast is mounted.

It is another primary object to provide a dual mast S/R vehicle wherein bending of the vehicle bases transmit essentially no bending moment to the masts.

It is another primary object to provide a dual mast S/R vehicle wherein each of the bases are separately supported on a floor rail.

It is another primary object to provide a dual mast S/R vehicle wherein each of the bases comprises a separate down-aisle motor drive.

It is still another primary object to provide a dual mast S/R vehicle wherein one of the motor drives is slaved to the other such that a single electrical controller jointly controls both motors to equally share the load.

It is another important object to releasibly join the bases for common carriage support and transport wherein the joint comprises two degrees of freedom, one vertical and one cross-aisle.

It is an important object to provide a single power transfer assembly for operation of a carriage disposed between the dual masts.

It is another important object to provide a beam for holding the masts apart a predetermined distance at the top and which comprises a pinned joint to the masts such that disturbances at the top are not transmitted as moment causing unwanted stresses.

It is another important object to provide a power transfer subassembly of a vertical drive assembly for a dual mast S/R vehicle which comprises a belt drive directly connected to a motor.

It is another important object to provide a vertical drive assembly in which the motor is horizontally disposed. It is another object to provide a belt driven vertical drive assembly whereby belt tension is adjusted by moving the motor up and down on motor mounting frame connections.

It is another object to provide jacks which affix the motor to the frame and which provide vertical adjustment of the motor to adjust the tension in the belt.

It is a chief object to provide light weight sprocket wheels for the belt drive to reduce vertical drive assembly starting inertia.

It is an important object to provide a modular vertical drive assembly for the dual mast S/R vehicle whereby the vertical drive assembly is assembled before being mounted onto the dual mast S/R vehicle.

It is another important object to provide a modular vertical drive assembly for the dual mast S/R vehicle whereby the vertical drive assembly is aligned and tested before being mounted onto the dual mast S/R vehicle.

It is still another important object to provide a modular vertical drive assembly which is facilely attachable to and detachable from a support frame of the dual mast S/R vehicle.

It is a further important object to provide a speed reducer for the vertical drive assembly which is located inside, along the axis of a cable winding and unwinding drum of the vertical drive assembly whereby the drum and speed reducer occupy essentially the same dimensional width across the dual mast S/R vehicle.

It is a still further important object to provide a vertical drive assembly comprising a wheel drive planetary speed reducer whereby the most highly loaded components of the vertical drive assembly are produced within the planetary speed reducer gearing.

It is another important object to provide a vertical drive assembly wherein a belt and sprocket wheels are used at the relatively high motor rotational rate where drive loads are lower.

It is a basic object to provide a vertical drive assembly for the dual mast S/R vehicle comprising a horizontally mounted motor which belt drives a speed reducer essentially disposed within the core of a cable winding drum.

It is an important object to provide a vertical drive assembly wherein brakes are juxtaposed and aligned along the axis of the drum rather than juxtaposed the axis of the motor.

It is another object to provide a chain free vertical drive assembly for the dual mast S/R vehicle.

It is another object to provide adjustment for the length of each cable such that the cables provide essentially the same horizontal lift position to the carriage along substantially the entire height of the masts.

These and other objects and features of the present invention will be apparent from the detailed description taken with reference to accompanying drawings.

BRIEF DISCRIPTION OF THE DRAWINGS

DETAILED DESCRIPTION OF THE ILLUSTRATED EMBODIMENTS

In this description, the term proximal is used to indicate the segment of the apparatus or device normally closest to the subject of discussion. The term distal refers to the other end. Reference is now made to the embodiments illustrated in FIGS. 1-13 wherein like numerals are used to designate like parts throughout.

Figure 1:
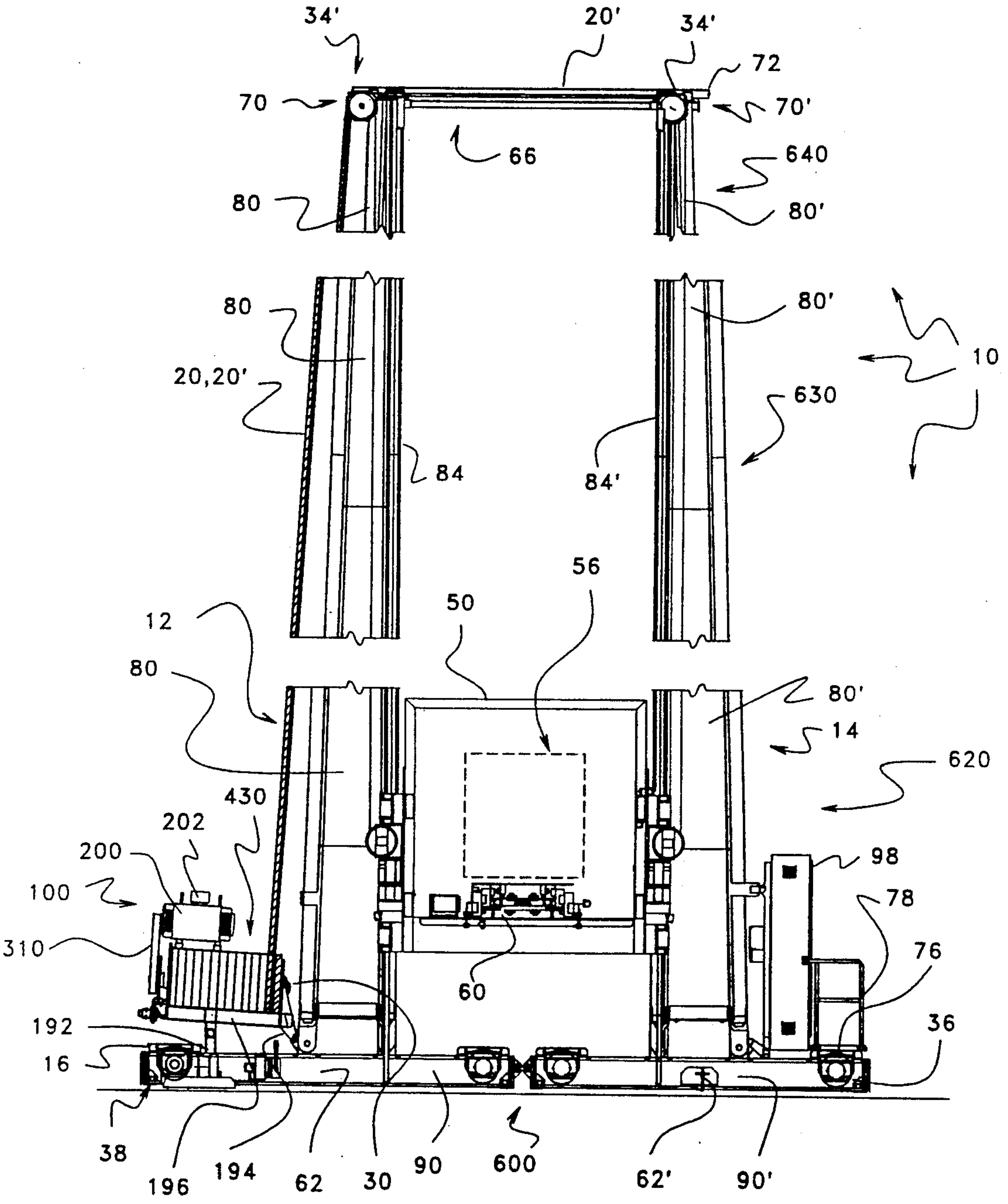
FIG. 1 is an elevation side view of a dual mast storage and retrieval (S/R) vehicle showing a carriage disposed between the masts, a vertical drive assembly of a dual mast S/R vehicle on the left side, and an electrical control system on the right side of the viewer.

Reference is now made to FIG. 1 wherein a segmented side view of a currently preferred embodiment of the invention comprising a dual mast S/R vehicle 10 is seen. Three segmental sections of the dual mast S/R vehicle 10, as seen in FIG. 1, comprise a top section 640 whereat the two masts are joined for vertical alignment and lateral alignment, a mid section 630 providing representation of the extensive height of the masts relative to the size of the base, and a bottom section 620 which comprises a vertical drive assembly 100 disposed on one base 90 adjacent one mast 80 and an electrical assembly 98 adjacent the other mast 80' and disposed on another base 90'. Base 90 is releasibly, but firmly joined to base 90' by a coupling 600, which is described in detail hereafter. A dual mast S/R vehicle within the scope of this invention may be made by modifying and joining two Single Mast Unit Load Century Systems avilable from Eaton-Kenway, 515 East 100 South, Salt Lake City, Utah, 84102.

Figure 2:
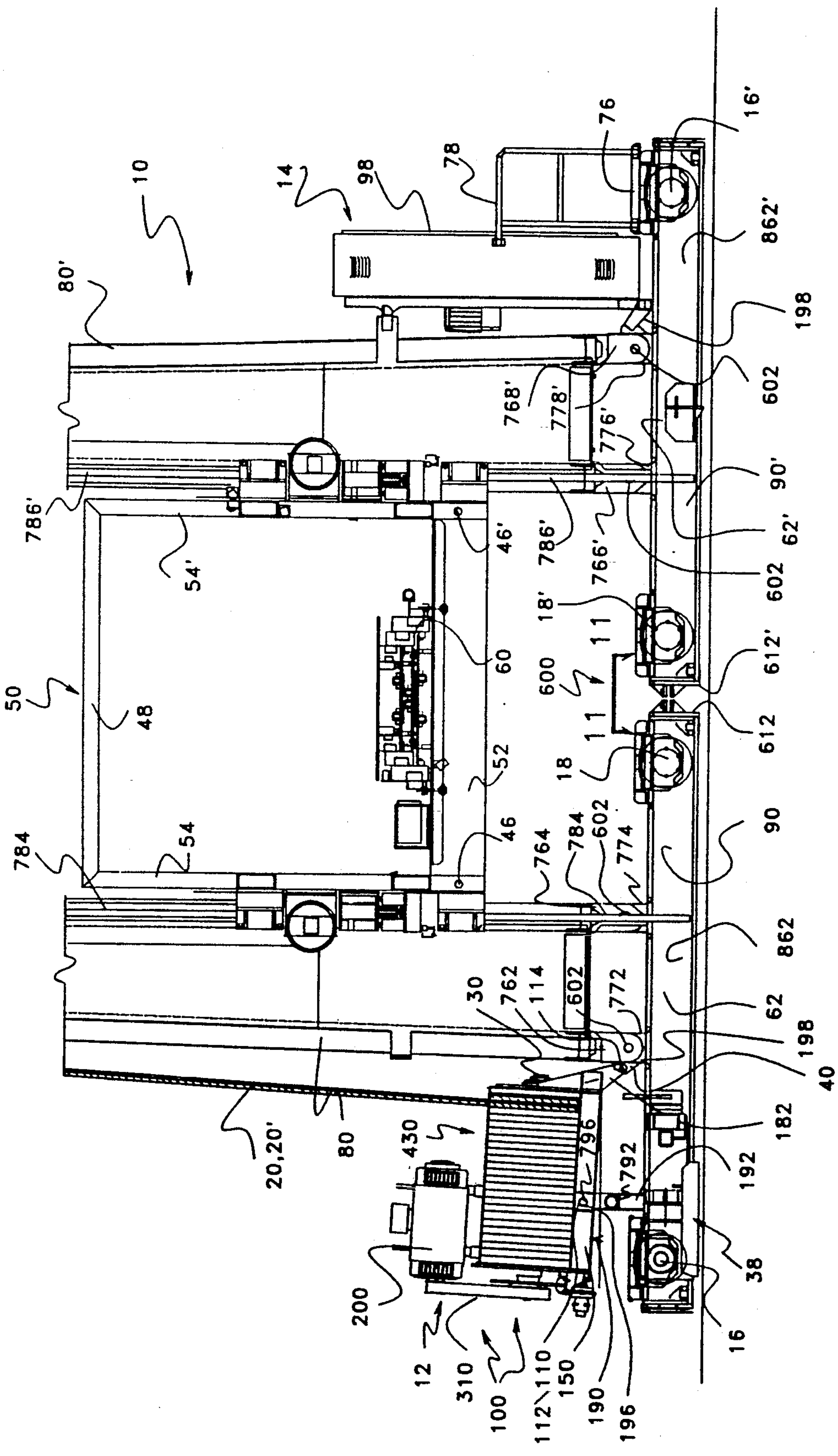
FIG. 2 is an elevation side view of the base section of the dual mast S/R system seen in FIG. 1.
Figure 3:
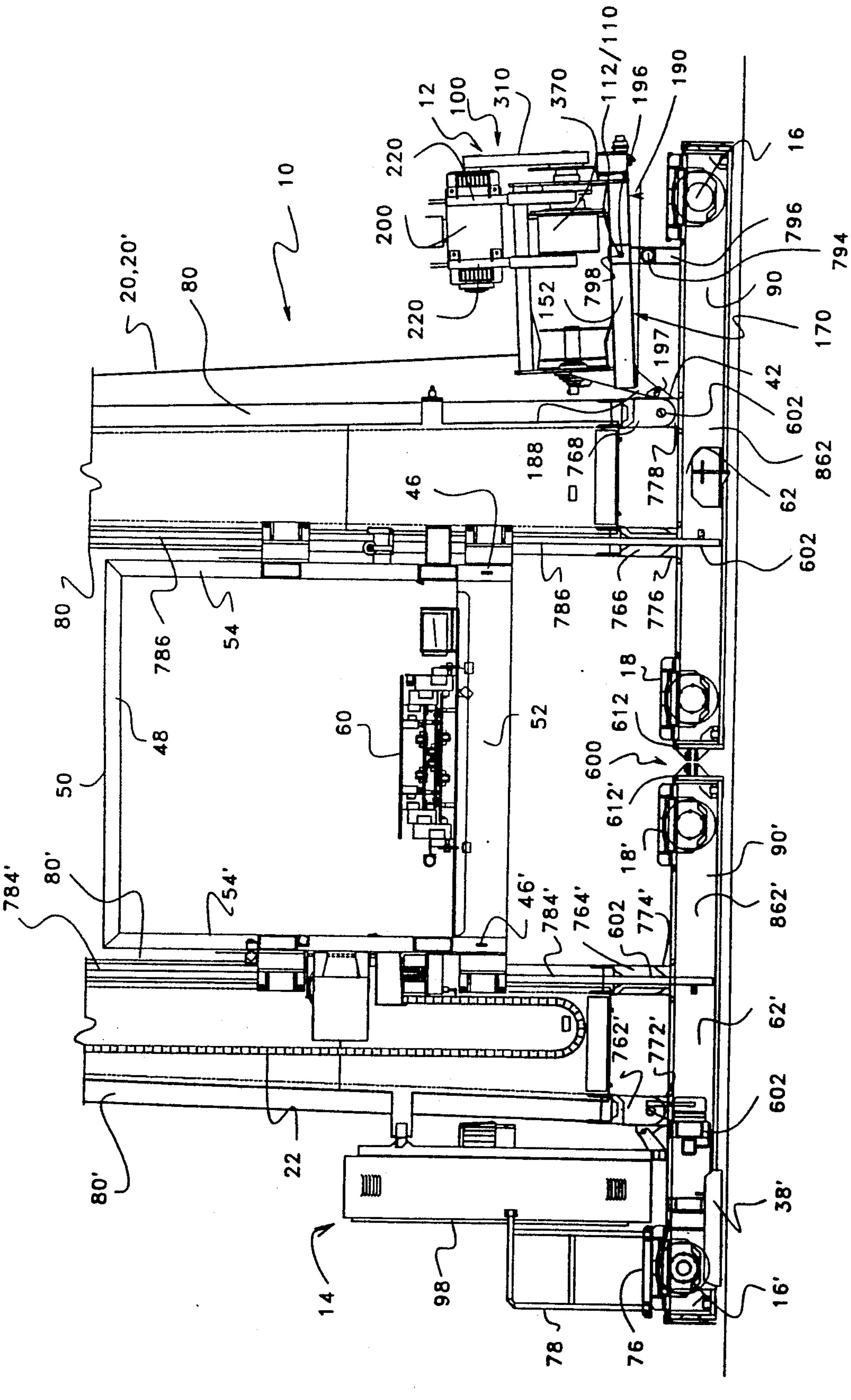
FIG. 3 is an elevation view of the other side of the dual mast S/R vehicle seen in FIG. 2.

A carriage 50 is disposed and travels vertically along a path between masts 80 and 80' as seen in FIGS. 2 and 3. Each mast 80,80' comprises a pair of centrally, vertically disposed rails 784 and 786 and 784' and 786' respectively, which provide vertical guides for biasing carriage 50 against lateral or cross aisle movement.

Except for the vertical drive assembly 100, electrical assembly 98, coupling 600, carriage 50 and other singly used parts on dual mast S/R vehicle 10, parts mounted on base 90 are the same as parts mounted in the same relative position on base 90'. Base 90' is rotated 180° relative to base 90 such that vertical guide rails 784, 786, 784' and 786' are medially juxtaposed. Thus oriented, base 90 is joined to base 90' with coupling 600.

Figure 11:
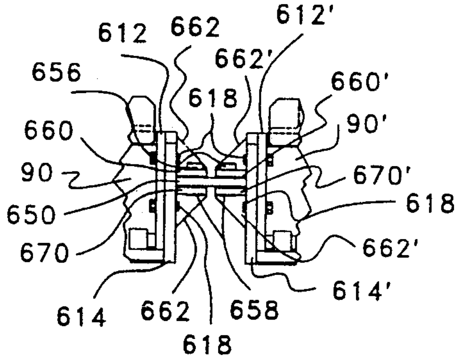
FIG. 11 is an elevation view of a base connection assembly along lines 11—11 of FIG. 2.

An elevation view of coupling 600 is seen in FIG. 11 which comprises a section of joined bases 90 and 90' as defined by lines 11—11 of FIG. 2. To joining end 612 of base 90, a vertical attachment plate 614 is releasibly, but firmly affixed by nuts and bolts 618. A top lateral coupling plate 660 is permanently affixed by welding or the like to attachment plate 614 such that top lateral coupling plate 660 extends normally and horizontally from attachment plate 614 and is disposed symmetrically across the longitudinal median line of the vehicle. A brace 662 is permanently affixed by welding or the like to attachment plate 614 and top lateral coupling plate 660, thereby forming a sturdy, rigid connecting plane for attachement to a coupling part. Brace 662 is disposed away from the longitudinal median line of the vehicle to provide clearance for movement of the coupling part. Another brace (not shown) is essentially a mirror image of brace 662, affixed in similar, but mirror image disposition to that of brace 662 on the other side of the longitudinal median line of the vehicle.

Juxtaposed top lateral coupling plate 660, a bottom lateral coupling plate 670 substantially of the same size and form as top lateral coupling plate 660, is permanently affixed by welding or the like to attachment plate 614 such that bottom lateral coupling plate 660 extends normally and horizontally from attachment plate 614. Spacing between top lateral coupling plate 660 and bottom lateral coupling plate 670 permits a ball bushing connector 650 to be disposed therebetween as the coupling part. Brace 662 permanently affixed to attachment plate 614, is also affixed by welding or the like to bottom lateral coupling plate 670, thereby forming a sturdy, rigid connecting plane for the coupling part comprising both lateral plates 660 and 670.

Similarly, to joining end 612' of base 90', a vertical attachment plate 614' is attached by nuts and bolts 618. A top lateral coupling plate 660' is permanently affixed by welding or the like to attachment plate 614' such that top lateral coupling plate 660' extends normally and horizontally from attachment plate 614'. Brace 662' is permanently affixed by welding or the like to attachment plate 614' and a top lateral coupling plate 670', thereby forming a sturdy, rigid connecting plane for attachment of the coupling part.

Juxtaposed top lateral coupling plate 660', a bottom lateral coupling plate 670' of substantially the same size and form as top lateral coupling plate 660', is permanently affixed by welding or the like to attachment plate 614' such that bottom lateral coupling plate 670' extends normally and horizontally from attachment plate 614'. Spacing between top lateral coupling plate 660' and bottom lateral coupling plate 670' permits the coupling part to be disposed therebetween. Brace 662' is permanently affixed by welding or the like to attachment plate 614' and bottom lateral coupling plate 670', thereby forming a sturdy, rigid connecting plane for the coupling part. Brace 662' is disposed away from the longitudinal median line of the vehicle to provide clearance for movement of the coupling part. Another brace (not shown), essentiallly is a mirror image of brace 662', affixed in similar, but mirror image disposition to that of brace 662' on the other side of the longitudinal median line of the vehicle.

Top lateral coupling plate 660 is disposed upon base 90 at substantially the same altitude as top lateral coupling plate 660' disposed upon base 90' and therefore bottom lateral coupling plate 670 is at substantially the same altitude as bottom lateral coupling plate 670'. The coupling part comprises ball bushing connector 650 which is assembled between the top and bottom coupling plates.

Figure 12:
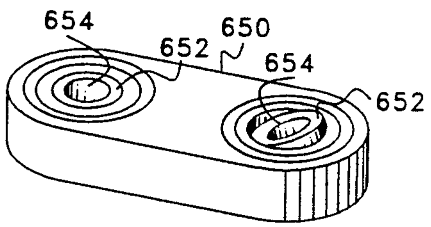
FIG. 12 is a perspective of the connecting assembly with ball joints used in the base connection assembly.

Ball bushing connector 650 is a connector which comprises two axial degress of freedom and is fixed in a third axis. As seen in FIG. 12, ball bushing connector 650 comprises two ball bushings 652 manufactured by processes well known in the art. Each ball bushing 652 may be one and one-half inches in diameter. Top lateral coupling plate 660 comprises a hole (not shown) and bottom lateral coupling plate 670 comprises a similar hole (also not shown), each such hole juxtaposed one above the other. Similarly, top lateral coupling plate 660' comprises a hole (not shown) and bottom lateral coupling plate 670' comprises a similar hole (also not shown), each such hole juxtaposed one above the other, each ball bushing 652 comprises a central hole 654. As seen in FIG. 11, one connecting bolt 656 is disposed through the hole top lateral coupling plate 660, the central hole 654 in a first ball bushing 652 and through the hole in bottom lateral coupling plaate 670. Coupling is consummated between base 90 and base 90' by disposing another connecting bolt 656 through the hole top lateral coupling plate 660', a central hole 654 in a second ball bushing 652 and through the hole in bottom lateral coupling plate 670'.

Figure 9:
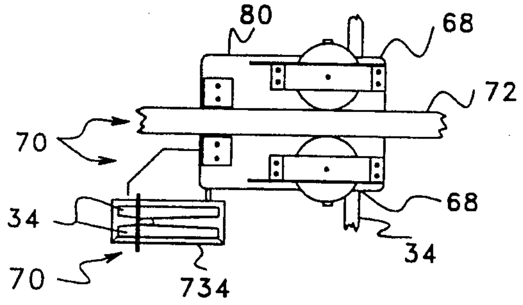
FIG. 9 is a plan view of the top of the mast colsest to the vertical drive assembly.

As seen in FIG. 1, dual mast S/R vehicle 10 comprises bases 90 and 90' upon which dual mast S/R vehicle 10 travels on a ground level floor rail disposed down-aisle where inventory is addressably stored. Rising from base 90, mast 80 extends upward to another rail or guide tube 72. As is better seen in FIG. 9, mast 80 is held thereat from lateral displacement by guide roller assemblies 68 on each side of rail or guide tube 72 by apparatus and methods well known as the ark. Two sheaves 34 on a common axle 734, one for each lift cable 20 and 20' are also seen in FIG. 9.

Figure 10:
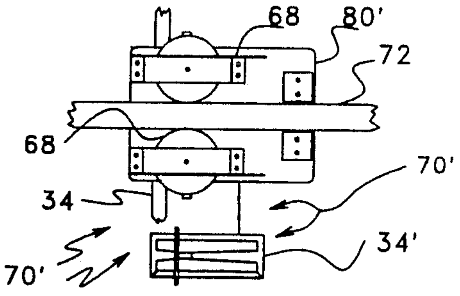
FIG. 10 is a plan view of the top of the mast closest to the electrical control system.

Similarly, rising from base 90', mast 80' extends upward to rail or guide tube 72. As is better seen in FIG. 10, mast 80' is held thereat from lateral displacement by another set of guide roller assemblies 68 on each side of rail or guide tube 72. Thereby, each mast 80, 80' of dual mast S/R vehicle 10 is stably held counter to lateral movement. As only lift cable 20' extends across the top of the space between masts 80 and 80' only a single sheave 34 is attached at the top of mast 80' as seen in FIG. 10.

Figure 13:
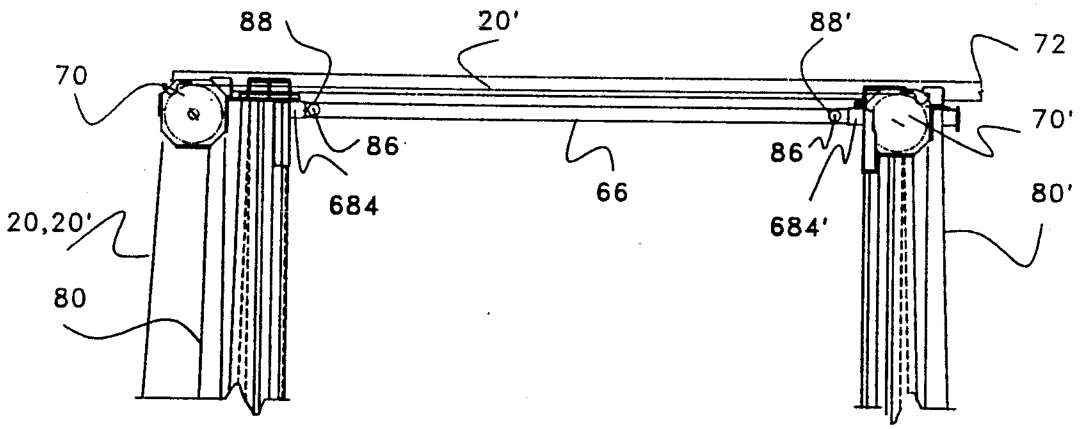
FIG. 13 is an elevation view of the top section of the dual mast S/R vehicle.

As best seen in FIG. 13, each mast 80 and 80' comprises a connecting lug 684 and 684', respectively. Each lug comprises a hole (not shown). A top mast support strut 66 comprises a hole on at end 88 which is juxtaposed the holes in lug 684 and wherethrough a pin 86 is inserted to hingeably connect mast 80 to top mast support strut 66. Similarly, top mast support strut 66 comprises a second hole at end 88' which is juxtaposed the hole in flange 684' and wherethrough another pin 86 is inserted to hingeably connect mast 80' to top mast support strut 66. Thus hingeably connected, bending moments are not transmitted from mast 80 and 80' through the junctions of top mast support strut 66.

Referring again to FIG. 1, a carriage 50 is disposed between each mast 80 and 80' and is raised and lowered therealong. Disposed upon carriage 50 is a shuttle 60 which is laterally displaced at predetermined inventory storage and retrieval sites to deliver and acquire a load 56 (seen as a dashed line box) as desired by an operator of dual mast S/R vehicle 10. One end of lift cable 20 is attached to one side of carriage 50 near mast 80 and passes upward therefrom through a three pull cable block system 70 which is at least partly located at the top of mast 80 and therethrough the plurality of sheaves 34 and then downward to a cable winding drum 430. Similarly, one end of lift cable 20' is attached to the other side of carriage 50 near mast 80' and passes upward therefrom through a three pull cable block system 70' which is at least partly located at the top of mast 80' and through the plurality of sheaves 34' across the mast pair in the vicinity of top mast support strut 66 to a guiding sheave 34, on a common axle 734 with another sheave 34 as earlier described on mast 80 and then downward to cable winding drum 430 in line with lift cable 20.

As best seen in FIGS. 2 and 3, carriage 50 comprises a carriage base 52, at least one vertical member 54 on the side of carriage 50 closest to mast 80 and at lest one other vertical member 54' on the other side of carriage 50 closest to mast 80'. One vertical member 54 is attached to the other vertical member 54' by at least one top strut 48. Vertical member 54 is connected to carriage base 52 by a pin assembly 46. Vertical member 54' is connected to carriage base 52 by a pin assembly 46'. Whereby, carriage base 52 is hingeably suspended between vertical members 54 and 54' . Thus suspended, the joining members between carriage base 52 and vertical members 54 and 54', are free of bending moments which would otherwise be applied to the joining members as the beams flex and bend.

Drum 430 is axially driven to wind and unwind lift cable 20 to lift and lower one side of carriage 50 along two guide rails 784 and 786 on each side of mast 80. At the same time lift cable 20' is similarly wound and unwound along two guide rails 784' and 786' on each side of mast 80' to lift the other side of carriage 50 in the same manner.

Figure 7:
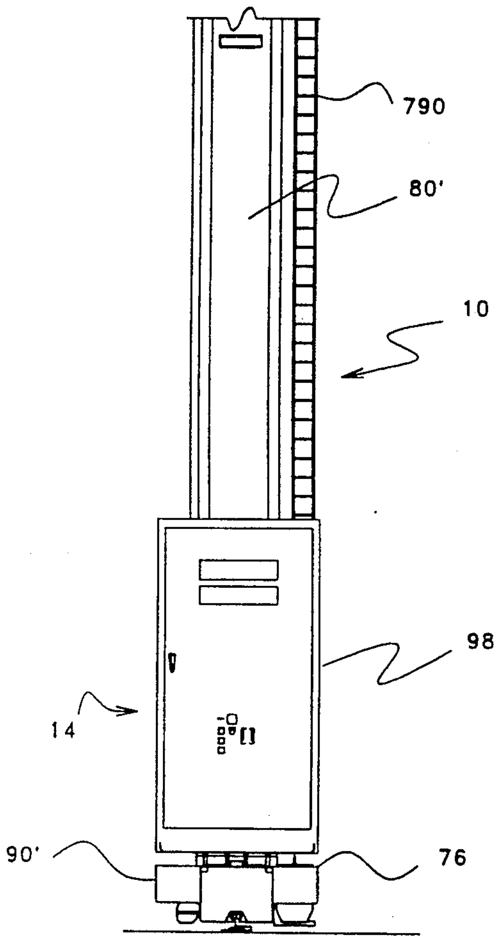
FIG. 7 is an elevation view of the end of the dual mast S/R vehicle which comprises the electrical control system.

An electrical cabinet and control panel 98 is disposed upon base 90' at an end 14 of base 90' which is distal to the end of dual mast S/R vehicle 10 which provides the path for carriage 50. At the end 14 a maintenance platform is located 76 on top of base 90'. As best seen in FIG. 7, electrical control cabinet 98 and other parts at end 14 do not extend outwardly from the cross-aisle envelope of base 90'. Also seen in FIG. 7 is a cable carrier with cables 790 through which electrical power and sensor signals are communicated to and from the carriage 50.

Base 90 comprises a drive wheel assembly 16 which provides power for down-aisle movement of base 90. Drive wheel assembly 16 also provides support for base 90 at end 12. At the end of base 90 which is distal from end 12, an idler wheel assembly 18 provides support for base 90. Base 90 is thereby independently supported from base 90'. Similarly base 90' comprises a drive wheel assembly 16' which provides power and support for base 90' at end 14 and an idler wheel assembly 18' which provides support at the end distal to end 14.

Coupling 600 comprises at least a vertical degree of freedom whereby vertical deflections caused by bending them to increased loading of base 90' and are not transmitted to base 90' and vice versa. Drive wheel assembly 16 is electrically controlled by a horizontal drive assembly 38' in the same manner a single mast vehicle is driven down-aisle. Also, drive wheel assembly 16' is similarly controlled by a horizontal drive assembly 38'. When base 90 is joined to base 90' to form vehicle 10, horizontal drive assembly 38 is electrically interconnected with horizontal drive assembly 38' in master/slave relationship such that the horizontal drive assembly of one of the drive wheel assemblies is a follower of the other. Such master/slave motor drives controllers are known and used in the art.

Each mast 80 and 80' is mounted upon and affixed to each associated base 90 and 90' in the same relative position and manner. For that reason, only the attachment of mast 80 to base 90 is described in detail. As seen in FIG. 2, base 90 is disposed upon drive wheel assembly 16 and idler wheel assembly 18 whereby it is supported at each end. A mid-point 62 is determined in support beam 862 of base 90, symmetrically about which the load of mast 80 is disposed. Thus disposed, the mass of mast 80 and other loads comprising carriage 50, shuttle 60, and variable load 56 forces bending of support beam 862 which is substantially symmetrically about mid-point 62. Such bending produces essentially zero down-aisle deflection in mast 80. Minimizing down-aisle deflections at base 90 is extremely critical for tall mast vehicles as any deflection angle is multiplied to provide large displacements at mid height of mast 80.

The position of mast 80 upon support beam 862 is determined by the disposition of mast support mounts 772 and 774 on one side of base 90 and by disposition of mast support mounts 776 and 778 on the other side of base 90. In similar fashion, the position of mast 80' upon support beam 862' is determined by the disposition of mast support mounts 772' and 774' on one side of base 90' and by disposition of mast support mounts 776' and 778' on the other side of base 90'.

Mast 80 comprises mast supports 762, 764, 766 and 768 as seen in FIGS. 2 and 3. As is known and practiced in the art mast supports and mast support mounts are juxtaposed in pairs such that mast support 762 is juxtaposed mast support mount 772 while mast 80 is horizontally disposed. While so disposed a hole for a mounting pin 602 is drilled along a common axis. Upon completion of the drilling a mounting pin 602 is forcibly inserted to provide a firm joint. In similar fashion, mast support mounts 774, 776 and 778 are joined to mast supports 764, 766 and 768.

Likewise, mast 80' is symmetrically disposed about mid-point 62' and attached to support beam 862' of base 90'. Mast support mounts 772' and 778' are similarly attached to mast supports 762' and 768', and mast support mounts 774' and 776' are so attached to mast supports 764' and 766'. Thus attached and carried by independently supported bases 90 and 90', each mast 80 and 80', respectively, provides essentially no down-aisle displacements which deleteriously affect components disposed between the masts or which so propagate to the other mast.

In the currently preferred embodiment, bases 90 and 90', masts 80 and 80', carriage 50, shuttle 60, cable block systems 70 and 70', electrical cabinet and control panel 98, and lift cables 20 and 20' and related parts are components of a Unit Load System currently produced and available from Eaton-Kenway a subsidiary of Eaton Corporation, 515 East 100 South, Salt Lake City, Utah, 84102 and are therefore not to be described in further detail herein.

Figure 8:
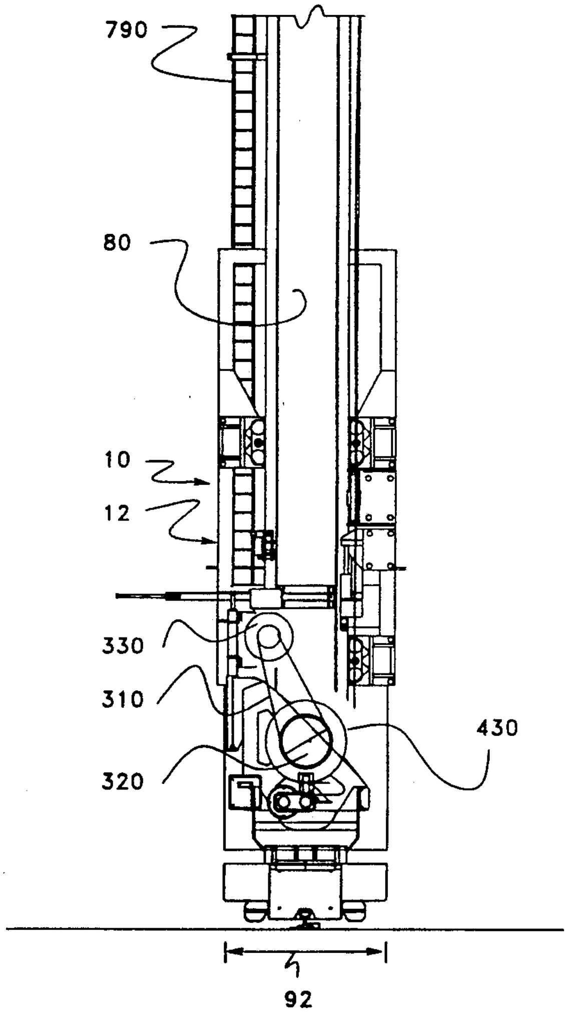
FIG. 8 is an elevation view of the end of the dual mast S/R vehicle which comprises the vertical transfer assembly of the vehicle.

Seen in FIG. 8, wherein the cable carrier with cables 790 is seen extending upward thru which power and control are communicated to the carriage 50. The width dimension 92 of all parts of dual mast S/R vehicle 10 is a critical design restraint. To allow maximum space for storage, aisle sizes have been set which severely restrict the width 92 of each storage and retrieval vehicle. In the past, this restriction has resulted in the design of vertically mounted motors and use of right angle speed reducers.

Figure 4:
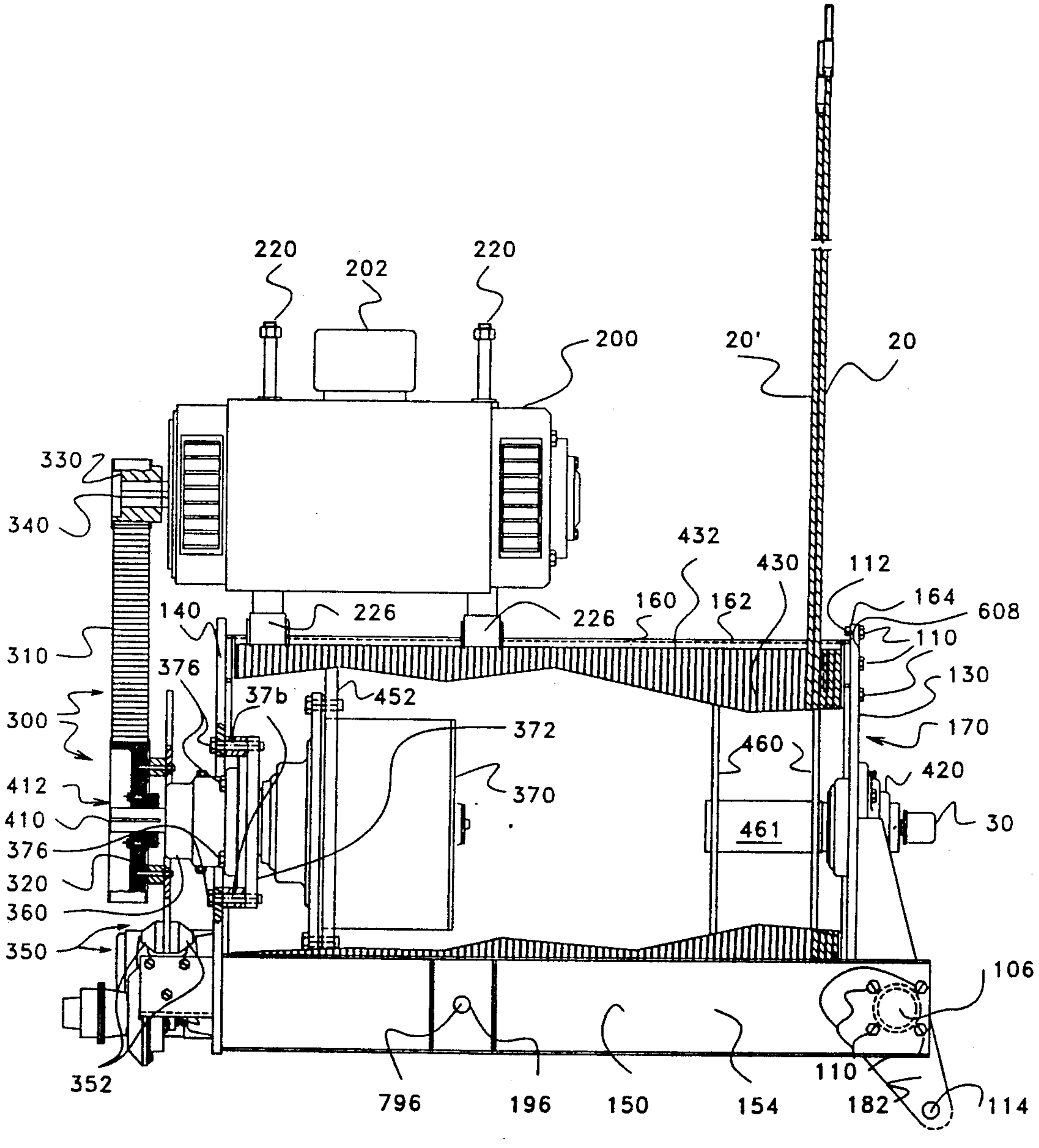
FIG. 4 is an elevation view of one side of the vertical drive assembly with parts cut away for clarity of presentation.
Figure 5:
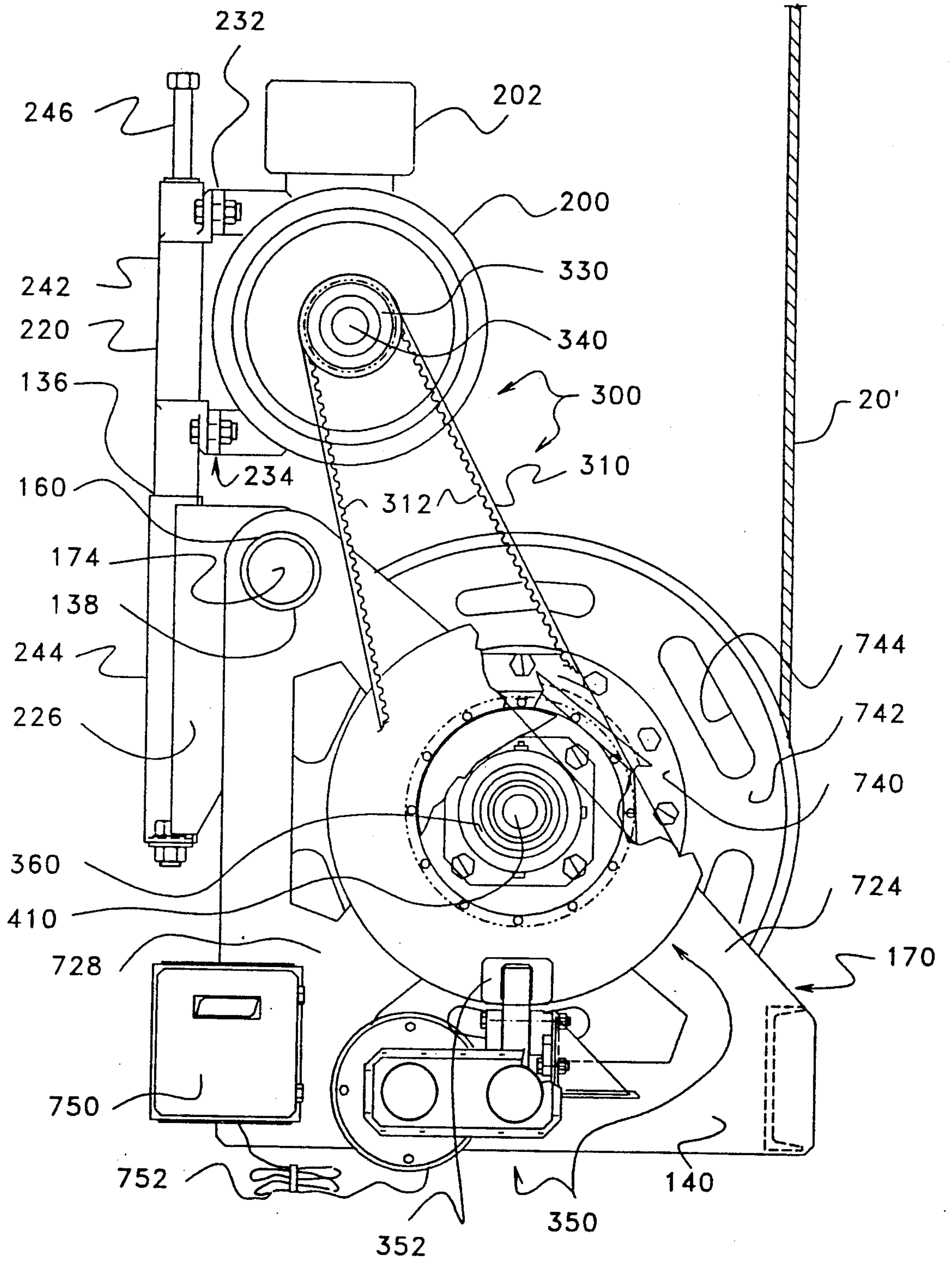
FIG. 5 is an elevation view of the vertical drive assembly as seen from the open end of the vehicle wherein a belt attachment is seen between a motor and an input adapter which connects through a planetary speed reducer to a drum.
Figure 6:
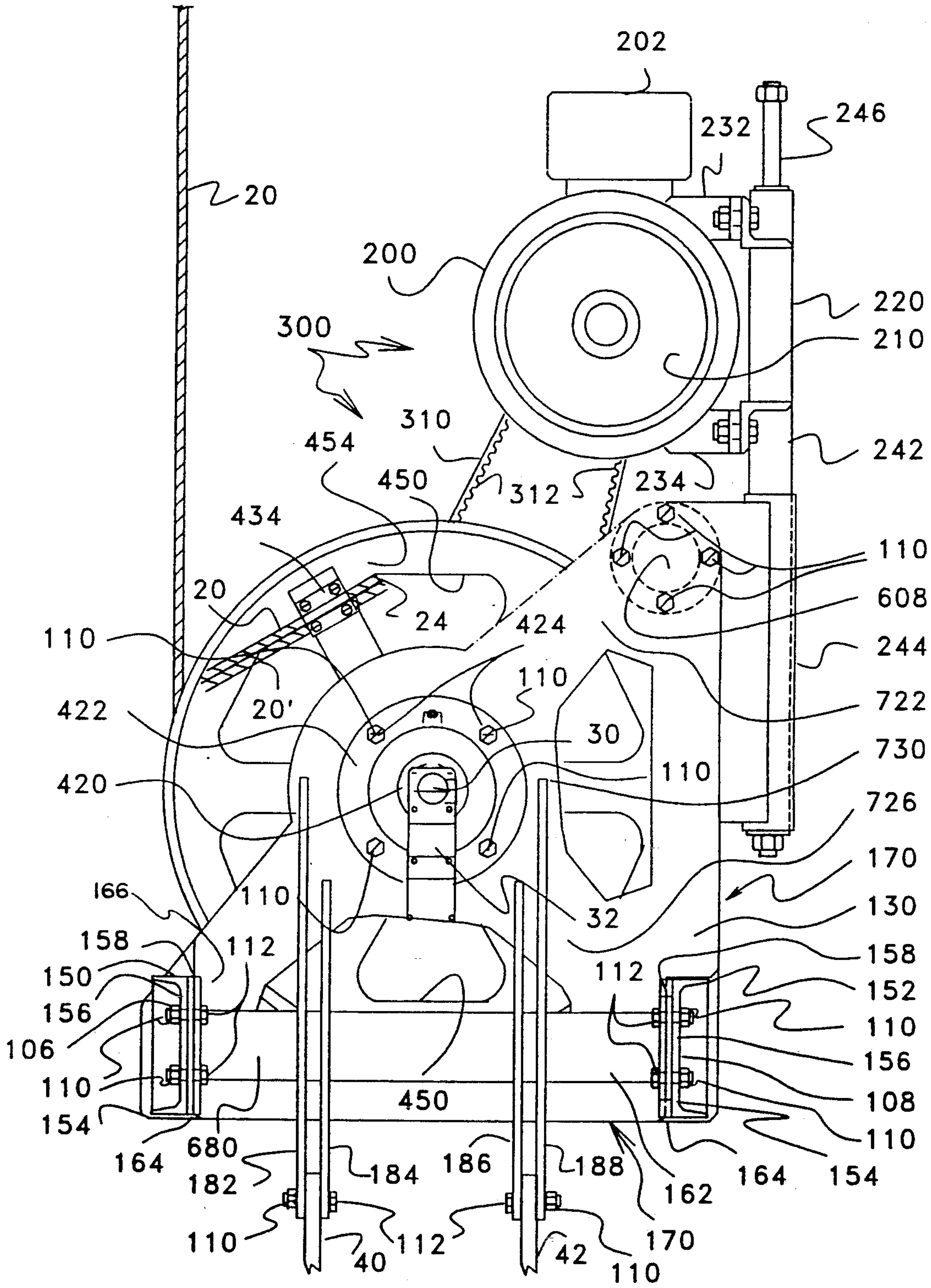
FIG. 6 is an elevation view of the vertical drive assembly showing a portion of the end of the vertical drive assembly closest to the mast and carriage.

Three views of vertical drive assembly 100 are seen in FIGS. 4–6. As seen in side presentation in FIG. 5, vertical drive assembly 100 comprises vertical drive assembly mounting frame 170, a motor 200, motor adjustment jacks 220, power transfer equipment 300, drum 430 and related equipment described in detail here-after.

Vertical drive assembly mounting frame 170 comprises triangular end supports 130 and 140, a lower frame support 680, two lower down-aisle supports 150 and 152, and an upper down-aisle support 160. Lower frame support 680 comprises a steel cylinder 162 with an attachment ring-plate 164 welded or otherwise permanently affixed at each end. As best seen in FIG. 6, each lower down-aisle support 150 and 152 comprises a channel member 154. Each open face 156 of channel member 154 is disposed outwardly cross-aisle thereby providing a solid backface 158 for attachement to other vertical drive assembly mounting frame 170 members.

At the end which comprises triangular end support 130 lower frame support 680 is disposed between the down-aisle supports 150 and 152 such that each ring-plate 164 is juxtaposed each backface 158. As best seen in combination in FIGS. 4 and 6, down-aisle support 150 and ring-plate 164 comprise corresponding holes at site 106. Down-aisle support 150 is firmly, but releasibly attached to one end of lower frame support 680 by a bolt 112 inserted through each of the corresponding holes and affixed with a nut 110. Similarly, down-aisle support 152 is attached to the other end of lower frame support 680 in the vicinity of site 108. Each triangular end support 130 and 140 is permanently affixed by welding or the like to each down-aisle support 150 and 152, thereby forming a rectangular base for vertical drive assembly mounting frame 170.

Triangular end support 130 and triangular support 140 are separated a sufficient distance that drum 430 rotates freely therebetween. As seen in FIG. 5, at site 174, triangular end support 140 comprises a hole 138 which is substantially the same size as the outer diameter of the cylinder 162 of down-aisle support 160. Cylinder 162, of upper down-aisle support 160, is inserted through hole 138 in triangular end support 140 and is welded or otherwise permanently affixed in place and is thereby disposed between triangular end supports 130 and 140.

As seen in FIGS. 4 and 6 upper down-aisle support 160 comprises an attachment ring-plate 164 welded or otherwise permanently affixed at the end disposed against triangular end support 130. Attachment ring plate 164 is contiguously juxtaposed the upper vertex of triangular end plate 130. Triangular end plate 130 and attachment ring plate 164 of upper down-aisle support 160 comprise corresponding holes at site 608. Upper down-aisle support 160 is firmly, but releasibly attached to triangular support 130 by a bolt 112 inserted through each of the corresponding holes and firmly affixed with a nut 110. So interconnected triangular side supports 130 and 140, lower frame support 680, lower down-aisle supports 150 and 152, and upper down-aisle supports 160 provide modular vertical drive mounting frame 170 upon which all vertical drive components are mounted and assembled and disassembled from the vehicle as a unit.

Lower frame support 680 comprises four medially disposed ring-tabs 182, 184, 186, and 188, used to releasibly attach the medially disposed portion of vertical drive assembly 100 to base 90. See FIGS. 2, 3, 4, and 6. Each ring tab 182, 184, 186 and 188 comprises an elongated, substantially triangular shapes and a hole through which cylinder 162 of lower frame support 680 passes. Each ring-tab, 182, 184, 186 and 188, is disposed as seen in FIG. 6 and is permanently attached to lower frame support 680 by welding or the like.

Ring-tabs 182 and 184 are paired and separated to accept a vehicle 10 base 90 support tab 40 if mast support 198 is disposed therebetween. Each ring tab 182 and 184 and support tab 40 comprise a juxtaposed hole at a first site 114 as seen in FIG. 2. A bolt 112 is passed therethrough affixed with a nut 110 to attach tab 40 and thereby base 90 to vertical drive assembly 100 at first site 114.

Similarly, ring-tabs 186 and 188 are paired and separated to accept a base 90 support tab 42 therebetween. Each ring tab 186 and 188 and tab 42 comprise a hole wherethrough an attachment bolt 112 is inserted and tightened with a nut 110 to affix vertical support assembly 100 at a second site 197. Thereby the vertical drive assembly mounting frame 170 is firmly but releasibly affixed to vehicle 10 at two sites.

Lower down-aisle support 150 comprises a hole 796 at site 196 which is centered laterally in the base of the channel member 154 of support 150 and disposed longitudinally such that the center of gravity of vertical drive assembly 100 is disposed between site 196 and site 114. As seen in FIG. 2, base 90 comprises a vertical support 192 disposed directly below site 196. Extending upward and firmly affixed to vertical support 192 is a support extender 792. Support extender 792 comprises a hole which is juxtaposed to hole 796 at site 196 when vertical drive assembly 100 is disposed thereat.

A bolt 112 is inserted through the juxtaposed holes and a nut 110 is tightened thereto to firmly but releasibly attach vertical drive assembly 100 to base 90 at a third site. The length of support extender 792 displaces vertical drive assembly from 170 an angle 190 from the horizontal such that the fleet angle of each lift cable 20, 20' away from drum 430 is substantially normal to the cylinder of drum 430. In like manner as seen in FIG. 3, a vertical support 796 attached to support extender 794 is releasibly, but firmly attached to lower down-aisle support 152 on the opposite side of vertical drive assembly 100 at a fourth site 196. There also, a bolt 112 is inserted through a hole 798 and a juxtaposed hole in support extender 794 and tightened with a nut 110 to allow modular release and assembly of vertical drive assembly mounting from 170 at the fourth site.

All of the other components of the vertical drive assembly 100, with the exception of electrical power sources, which are provided by vehicle 10, are mounted upon frame 170. Thus, vertical drive assembly 100 is attached to and detached from vehicle 10 as a unit allowing assembly and test of vertical drive assembly 100 at a site remote from vehicle 10. Frame 170 parts may be constructed from steel.

As best seen in FIG. 6 triangular end support 130 comprises a right angle triangle shape with radiused corners, right angle bisecting support 726 and a diagonal support 722 disposed substantially along the hypotenuse of support 130. At the junction of right angle bisecting support 726 and diagonal support 722 a circular mounting ring 730 is disposed. Circular mounting ring 730 comprises adequate surface area and mass to provide attachment support from drum 430 and other vertical drive assembly 100 components, a detailed description of which is provided hereafter. Circular mounting ring 730 comprises a central hole wherethrough a bearing 420 is disposed and attached. Bearing 420 is firmly attached to triangular end support 130 by a mounting ring 422, which comprises holes 424 which are juxtaposed with holes (not shown) in circular mounting ring 730. A bolt 112 is inserted through each hole 424 and a like juxtaposed hole in circular mounting ring 730 and firmly affixed by a nut 110. Bearing 420 at least partially resides within the core of drum 430 and is connected to drum 430 by radially projecting stiffener plates 460 and stub shaft 461. See FIG. 4.

Also attached to circular mounting ring 730 by a stationary part 32 is an encoder 30. A movable part of encoder 30 is attached to stub shaft 461 whereby rotation of drum 430 is detected and encoded for transmission to an electronic control system of vehicle 10. Thereby, movement of vertical drive assembly 100 is detected for use in monitoring and controlling the positioning of carriage 50. Electrical connections are not shown, but are conventional and well known in the art.

As seen in FIG. 5, triangular end support 140 comprises a right angle triangular shape with radiused corners, a right angle bisecting support 728, and a diagonal support 724 disposed substantially along the hypothenuse of support 140. At the junction of right angle bisecting suppot 728 diagonal support 724, a circular mounting ring 740 is disposed. Circular mounting ring 740 comprises adequate surface area and mass to provide attachment support for an adapter ring 378, best seen in FIG. 4.

Triangular end support 140 is affixed by bolts or the like to adapter ring 378 which is axially aligned with and attached to an input adapter 360 and thence to a speed reducer 370 which is aligned along the axial path of drum 430. As seen in FIG. 4, a reducer mounting flange 372 is firmly attached through the adapter ring 378 by bolts 376 to triangular side support 140 along the line of drum axle 410. Input adapter 360 is attached to the face of the reducer mounting flange 372 with bolts 376. Therealong, input adapter 360 and a speed reducer 370 join to form a final link of power transfer components 300 to drum 430. The power transfer components 300 comprise parts which directly receive output from a motor 200 and thereby drive drum 430 to take-up and release lift cables 20 and 20'.

When the function of power translation using belts or chain follows the function of the speed reducer in the power train, forces imposed upon the power translation component are consistent with the lower speed, higher torque and require a chain or other high stress linkage. Conversely, by placing the function of power translation using belts or chain before the speed reducer in the power train, forces imposed on the power translation component are consistent with the higher speeds of motor 200. The higher speed and lower torque permit a belt to be used as the power translation component in vertical drive assembly 100. Chains require constant lubrication during use and regular maintenance. Belts require no lubrication and are therefore superior in this application.

Referring to FIG. 4, the serial linkage of power transfer components 300 comprise a drive sprocket wheel 330, a belt 310, a driven sprocket wheel 320, input adapter 360, and speed reducer 370 acting in seriatim to drive drum 430. Drive sprocket wheel 330 connects directly to the shaft of motor 200 and engages belt 310 at a first site 340. Belt 310 translates power from drive sprocket wheel 330 to driven sprocket wheel 320 at a second site 412 which is in line with input adapter 360 and shaft 410 which is on the axis of the cylinder of drum 430.

As seen in FIG. 5, belt 310 is similar to a timing belt comprising teeth 312 which correspond to the form and separation of sprockets in sprocket wheels 320 and 330. Belt 310 and sprocket wheels 320 and 330 may be Gates Polychain Belt and Sprockets, manufactured by Gates Rubber Company, 990 South Broadway, Denver, Colo. 80217, and distributed by Kaman Bearing and Supply Company, 3173 West 2100 South, West Valley City, Utah 84119.

Sprocket wheels 320 and 330 used in the currently preferred embodiment are aluminum although any lightweight material capable of bearing the stresses of the belt 310 drive may be used. As the sprocket wheels 320 and 330 and therefore belt 310 operate directly off motor at speeds congruent with motor 200 rotational speeds, starting inertia is critical. Aluminum sprocket wheels were specially developed after early tests proved the total starting inertia of steel sprocket wheels was as large as the starting inertia of carriage 50.

Driven sprocket wheel 320 is directly connected to shaft 410 and therethrough to input adapter 360. As earlier described, the stationary portion of input adapter is firmly attached to the reducer mounting flange face 372. Input adapter 360 may be part number 00-1311.07, available from Rockford Manufacturing, Roscoe, Ill. The rotary driven portion of input adapter 360 is connected to the input shaft of speed reducer 370.

Speed reducer 370 receives the relatively high rotational speeds of driven sprocket wheel 320 and provides drum 430 with a lower revolutionary rate, but higher torque output. Thus, the most highly loaded components of the drive load are put into planetary gearing. Planetary gears are arranged to transmit the load through multiple load paths resulting in smaller reducer sizes. As seen in FIG. 4, a portion of input adapter 360 and speed reducer 370 reside within the core of drum 430 to provide a narrow silhouette. Speed reducer 370 may be a wheel drive planetary reducer such as part number W12D, available from Fairfield Manufacturing, Lafayette, Ind. Speed reducer 370 connects to drum 430 via reducer mounting ring 452 as is seen in FIG. 4.

In the currently preferred embodiment, motor 200 is horizontally disposed and is juxtaposed drum 430 as best seen in FIG. 4. Such juxtaposition of motor 200 next to drum 430 allows relatively large motors disposed horizontally along the down-aisle length of base 90 of vehicle 10. A motor 200 is sized and selected for maximum projected load carried by carriage 50 for each vehicle 10 application and may be in excess of 75 horsepower. Each motor 200 is selected from commercially available motors. Such motors are widely used and are known and available in the art. Also, junction boxes which provide electrical connection for motor 200 such as junction box 202 seen in FIGS. 4–6 are known and available in the art.

Motor 200 is adjustably connected to vertical drive assembly 100 frame 170 by two jacks 220. Each jack 220 comprises one tube 242 which telescopically is raised and lowered inside another tube 244 as seen FIGS. 5 and 6. A threaded jacking bolt 246 is rotated to adjust the height of tube 242 relative to tube 244. Each jack 220 may be part number B0069163-001, available from Eaton-Kenway, subsidiary of Eaton Corporation, 515 East 100 South, Salt Lake City, Utah, 84102. Motor 200 is attached to each jack 220 by an upper support arm 232 and a lower support arm 234 connected to tube 242 such that when tube 242 is raised or lowered, the height of motor 200 is similarly adjusted. By raising and lowering motor 200 the tension in belt 310 is adjusted, thereby permitting belt 310 adjustment without the use of an additional device which provides a measure of additional tension by riding upon and thereby wearing upon belt 310.

Each jack 220 is attached to down-aisle support 160 of frame 170 by a support member 226. Attachment of each support member 226 is similar to the attachment of ring-tab 182 whereby each support member 226 comprises a hole through which cylinder 162 of down-aisle support 160 is inserted and permanently affixed in place by welding or the like. Thereby, motor 200 is attached to frame 170 and made a part of the modular unit vertical drive assembly 100.

As seen in FIGS. 4 and 5, a disc brake 350 is used. Brake 350 is disposed on the axis 410 of the cylinder of drum 430 medial to driven sprocket wheel 320 which is not seen due to a cut-away in FIG. 5. Brake calipers 352 are attached to a support which is firmly affixed to frame 170.

In this currently preferred embodiment the calipers 352 are spring actuated and electrically released. A brake controller 750 receives and conditions braking commands received from the electrical control system 98 which is disposed on based 90′. Brake actuation commands are transmitted via electrical cable 752 to control braking status of brake calipers 352. Thus positioned, braking is accomplished distant from the motor 200 and the driving sprocket 330 in power transfer assembly 300.

Drum 430 comprises a helically grooved surface 432 comprising a side-by-side dual helix which guides the winding of each lift cable 20 and 20′. Drums with such surfaces are known and available in the art. As seen in FIG. 6, each lift cable 20 and 20′ is firmly affixed to drum side support 454 by a cable clamp 434. Such cable clamps 434 are also known and available in the art. Thereby, each left cable 20 and 20′ is anchored on one end 24 to drum 430. The wound part of each lift cable 20 and 20′ is disposed upon the surface 432 of drum 430. From the surface of drum 430, each lift cable 20 and 20′ follows a path upward to a three pull cable block system 70. See FIG. 1. Through cable block system 70, each lift cable 20 and 20′ follows a path directly to carriage 50 where it is anchored by apparatus which is well known and available in the art to lift and control lower carriage 50 along guide rails 784, 786, 784′ and 786′. FIGS. 2 and 3, mast 80 comprises a pair of guide rails 784, and 786, one guide rail disposed on each cross aisle side of mast 80. Similarly, mast 80′ comprises a pair of guide rails 784′ and 786′.

Referring again to FIG. 4, drum 430 derives central bearing support from bearing 420 and speed reducer 370. Stiffener plates 460 are centrally attached to bearing 420 and extend radially outward to be internally affixed to and provide support for the stub shaft 461 end of drum 430. Similarly, at least one reducer mounting ring 452 is centrally attached to speed reducer 370 and extends radially outward to be internally affixed to and provide support for drum 430 on the input adapter 360 side of drum 430.

Stiffener plates 460 comprise regularly spaced holes 450, allowing air pasage therethrough. Also as seen in FIG. 6, side support 454 of drum 430 comprises holes 450 through which air passes. Similarly, on the reducer 370 side of drum 430, a side support 742 comprises openings or holes 744 through which air also freely passes.

To cause vertical drive assembly 100 to raise or lower carriage 50, horizontally disposed motor 200 is energized to directly rotate drive sprocket wheel 330 which is part of power transfer assembly 300. In seriatim, the other parts of the power transfer assembly 300 transfer power to drum 430. Drive sprocket wheel 330 moves belt 310 at the higher linear speeds derived from motor 200 and drive sprocket wheel 310 rotational rates. Similarly, belt 310 translates the higher linear speed to rotationally drive driven sprocket wheel 320 which provides input rotary motion to input adapter 360. Input adapter 360 transfers power along the axis of drum 430 to speed reducer 370 which is located within the core of drum 430. Speed reducer 370 transfers a lower speed, but higher torque rotation to drum 430 which shortens and lengthens the free end of lift cable 20.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A dual mast storage and retrieval vehicle comprising:

carriage means on the vehicle upon which goods are placed for vertical transport;

two masts which jointly support the carriage means, which carriage means travels vertically between the two masts;

first base means which fully support one of the masts disposed thereon, said first base means comprising horizontally disposed means for bearing weight imposed by the one mast and mast connecting means upon said weight bearing means such that resultant bending of the weight bearing means due to load received from the one mast is symmetrically distributed about the mast connecting means relative to the first base means thereby providing relatively load independent, essentially only vertical displacement of the one mast due to the imposition of weight;

second base means which fully support the other mast disposed thereon, said second base means comprising horizontally disposed means for bearing weight imposed by the other mast and mast connecting means centrally disposed upon said weight bearing means such that resultant bending of the weight bearing means due to load received from the other mast is symmetrically distributed about the mast connecting means relative to the second base supporting means thereby providing relatively load independent, essentially only vertical displacement of the other mast due to the imposition of weight;

each of said base means comprising ground support means essentially independent from the other base means and each of said base means comprising down-aisle drive means said down-aisle drive means being interconnected in master/slave relationship such that the vehicle is powered to move in only one direction at any given moment;

coupling means which joins said base means to form a single vehicle, said coupling means comprise first means for rotatingly varying the disposition of said first base means relative to the base means in down-aisle and cross-aisle directions and second means for rotatingly varying the disposition said second base means relative to the first base means in down-aisle and cross-aisle directions thereby permitting variation in vertical displacement and cross-aisle displacement between the first base means and second base means while maintaining an essentially constant down-aisle coupling distance and thereby constraining the distance between the masts to be essentially constant.

2. The dual mast storage and retrieval vehicle according to claim 1 wherein said vehicle further comprises spar means which further comprise means for attaching the spar means to the top of each mast whereby mast-to-spar means to mast connections provide added stability to the two carriage supporting masts.

3. The dual mast storage and retrieval vehicle according to claim 2 wherein said attaching means comprise hingeable connections whereby non-uniform mast deflection at the top of the masts due to variations in loading and vehicle dynamics do not add stressing moments to said attaching means.

* * * * *